US005634067A

United States Patent [19]

Nagazumi

[11] Patent Number: 5,634,067

[45] Date of Patent: May 27, 1997

[54] SYSTOLIC ARRAY PROCESSOR

[75] Inventor: Yasuo Nagazumi, 14-20, Ootsuka 6-chome, Bunkyo-ku, Tokyo 112, Japan

[73] Assignees: G.D.S. Co., Ltd.; Yasuo Nagazumi, both of Tokyo, Japan

[21] Appl. No.: 344,650

[22] Filed: Nov. 18, 1994

[30] Foreign Application Priority Data

Nov. 18, 1993 [JP] Japan .................................... 5-312640

[51] Int. Cl.$^6$ .................................................... G06F 7/52

[52] U.S. Cl. ............................ 395/800; 395/27; 364/135; 364/862

[58] Field of Search ................................ 395/800, 21, 24, 395/27; 364/807, 822, 862, 841, 135

[56] References Cited

U.S. PATENT DOCUMENTS 4,888,724 12/1989 Marom et al. ........................... 364/807

FOREIGN PATENT DOCUMENTS 5165799 12/1991 Japan .
736845 3/1993 Japan .
6237173 8/1994 Japan .

OTHER PUBLICATIONS

Kung "Tutorial:Digital Neurocomputing for Signal/Image Processing" 1991.

Lee et al. "A Mixed Signal VSI Neuro–processor for Image Restoration" 1992.

Moveno et al "An Analog Systolic Neural Processing Architecture" Jun. 1994.

*Primary Examiner*—Barry D. Donaghue

[57] ABSTRACT

A systolic array processor is provided which is adapted to virtually constitute a number of analog type pipelining processors which operate in a parallel manner on an analog type shift register array such as a CCD or the like. The processor is composed of a plurality of signal processors for performing signal processings for a plurality of signals including an analog signal or signals supplied as input signals thereto and determining analog outputs, a shift register array or shift register mesh consisting of a plurality of shift registers, and a timing controller for controlling signal processings, arithmetic additions, shift operations and sequences in time of control for shift directions, of the shift registers. The shift register array or mesh includes analog shift registers having functions of performing the addition of input signals, and the analog outputs are supplied to the analog shift registers as one input signals thereof, respectively.

16 Claims, 3 Drawing Sheets

SYSTOLIC ARRAY PROCESSOR

BACKGROUND OF THE INVENTION

1. Field of the Invention

The present invention relates to a systolic array processor which is adapted to virtually constitute a number of analog type pipelining processors which operate in a parallel manner on an analog type shift register array such as a CCD (charge coupled device) or the like.

2. Prior Art

Heretofore, in a processing of analog signals using a DSP (digital signal processor) or the like, a pipelining process is broadly adopted for the purpose of processing signals at a high speed, and the pipeline process produces an arithmetic operation of a much higher accuracy as compared with pure analog processing and also permits processing in a region of relatively low frequency such as an audio signal or the like.

A separate device for parallel processing for higher processing speed is indispensable for processing of enormous or extensive data such as a real time processing of a video signal or the like. However, it is difficult in practice to perform a relatively complicated processing mainly because of economics, such as the cost of an arithmetic unit.

On the other hand, in case of “a parallel analog signal processing using a resistor network” the study of which goes on progressing in a field of artificial retina called “vision chip” or the like, there is an advantage that signal processing can be performed at a high speed by small-sized hardware by performing the signal processing for analog signals on the resistor network without any A/D or D/A conversion. However, the function thereof tends to be limited and it appears to be a disadvantage that the setting of characteristics thereof cannot be done so freely as in DSP.

Also, for the purpose of a signal processing for a specific use such as Fourier transform is practically used a digital type systolic array in which many digital arithmetic devices are arranged in a mesh configuration and two-dimensional pipeline processing is performed. However, in order to meet analog input signals having a high possibility of being applied in parallel, many analog-digital (A/D) converter means are naturally needed and this is a defect in improving the performance thereof economically and further lack of flexibility in application is an important problem.

The present invention intends to provide an analog systolic array processor which brings to realization of a two-dimensional pipelining processor wherein signal processing for a sum of product operation or the like in analog domain can be done in parallel by performing signal processing such as multiplications between digital signals and analog signals having a high possibility of being applied in parallel such as video information without any conversion of the analog signals and by effecting successive addition of the result of the signal processing to an addition node moving on an analog shift register at a proper timing.

SUMMARY OF THE INVENTION

The present invention is done in view of the foregoing and intends to provide an analog systolic array processor which comprises: a plurality of signal processors for performing signal processing each of which receives a plurality of input signals including an analog signal and determines at least one analog output signal; a shift register array or shift register mesh composed of a plurality of analog memory means including memories which have a function for addition of signals at least one of which is the analog signal generated by said signal processor; and a timing controller for controlling timings of signal processing and timings of addition to memories for each processor, and timings and directions of shifting for each memory means.

BRIEF DESCRIPTION OF THE DRAWINGS

The above and other aspects of the present invention will become clear from the following description which is given by way of example but not limited thereto, with reference to the accompanying drawings in which.

DETAILED DESCRIPTION OF THE PREFERRED EMBODIMENTS

Now the present invention will be described in detail with reference to the accompanying drawings.

Figure 1:
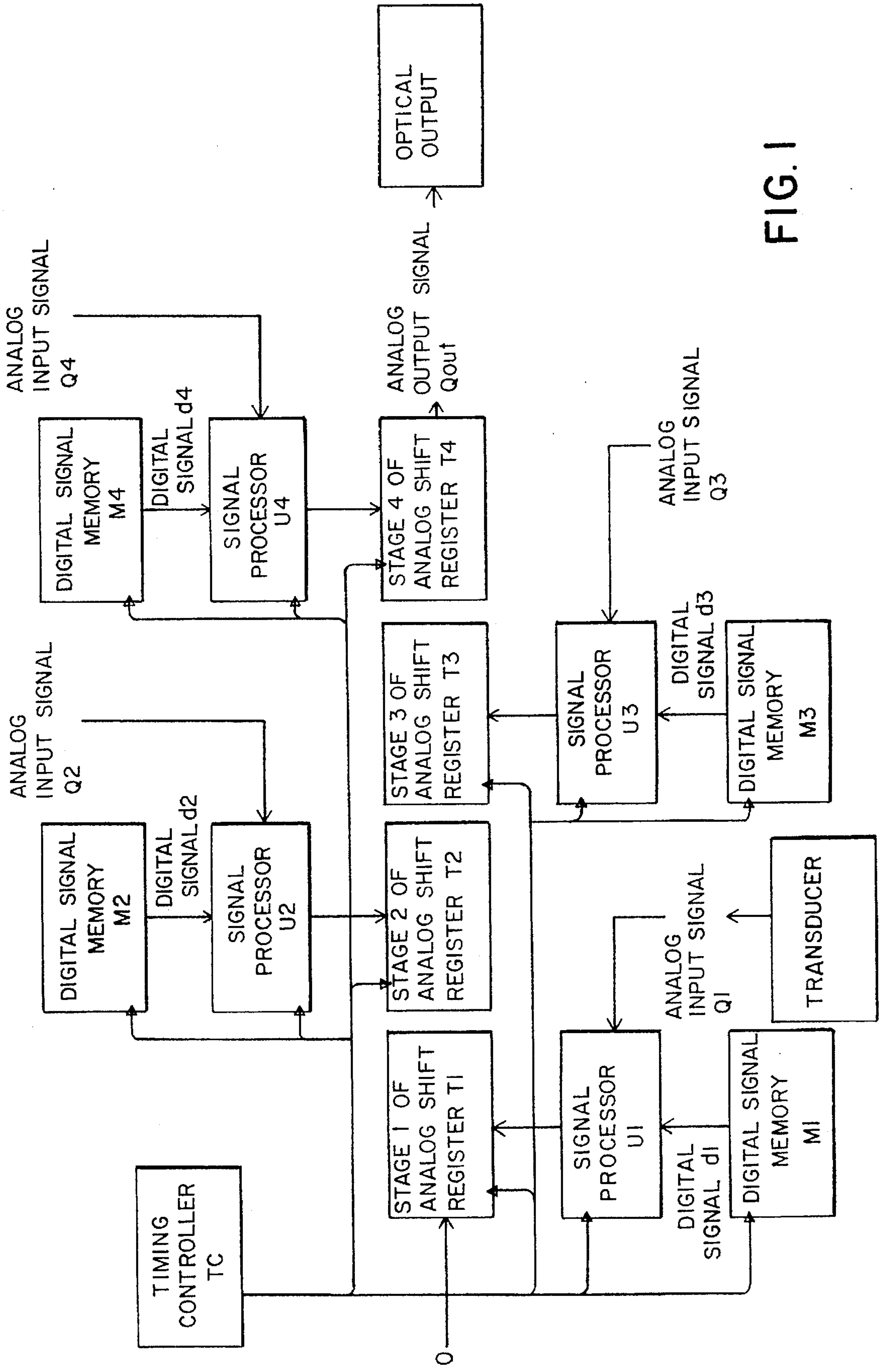
FIG. 1 is an illustration showing a basic construction of one embodiment of the present invention.

FIG. 1 is an illustration showing a basic construction of one embodiment of the present invention.

In FIG. 1, Qi denotes an analog input signal (i=1, 2, 3, 4), di denotes a digital signal, Ui denotes a signal processor, Ti denotes a stage of an analog shift register, Mi denotes a digital signal memory. Also, TC denotes a controller which controls a timing for activating the elements described above.

Figure 2:
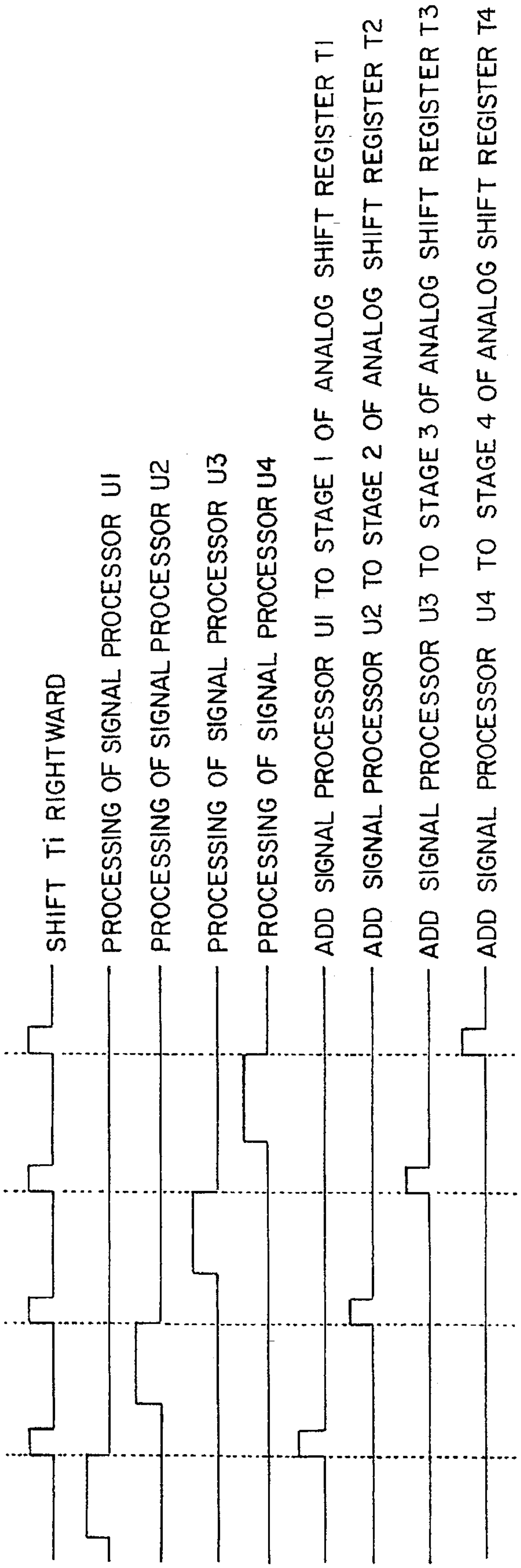
FIG. 2 is a timing chart showing timings of operations of the respective elements in case of performing a sum of product operation in accordance with the basic construction of the present invention by using multipliers as signal processors Ui.

FIG. 2 is a chart showing timings of operations of the respective elements described above in case of performing a sum of product operation shown in the following equation (1) with the construction of FIG. 1 by using, as signal processors Ui in FIG. 1, multipliers as disclosed, for example, U.S. Pat. No. 5,539,404 printed on Jul. 23, 1996 and filed by the same applicant as that of the present application.

$$QOUT = \sum_{i=1}^{4} (Qi \cdot di)/d\text{max} \quad (1)$$

In the above equation (1), dmax is the maximum value of a digital data, and if a digital data is a data of, for example, 4 bits, dmax is $2^4=16$.

The foregoing shows the case that a sum of product operation is performed, and if each of the signal processors Ui of FIG. 1 generates an output in accordance with an arbitrary function Fi, the equation (1) is rewritten as follows.

$$QOUT = \sum_{i=1}^{4} Fi(Qi) \quad (1')$$

Figure 3:
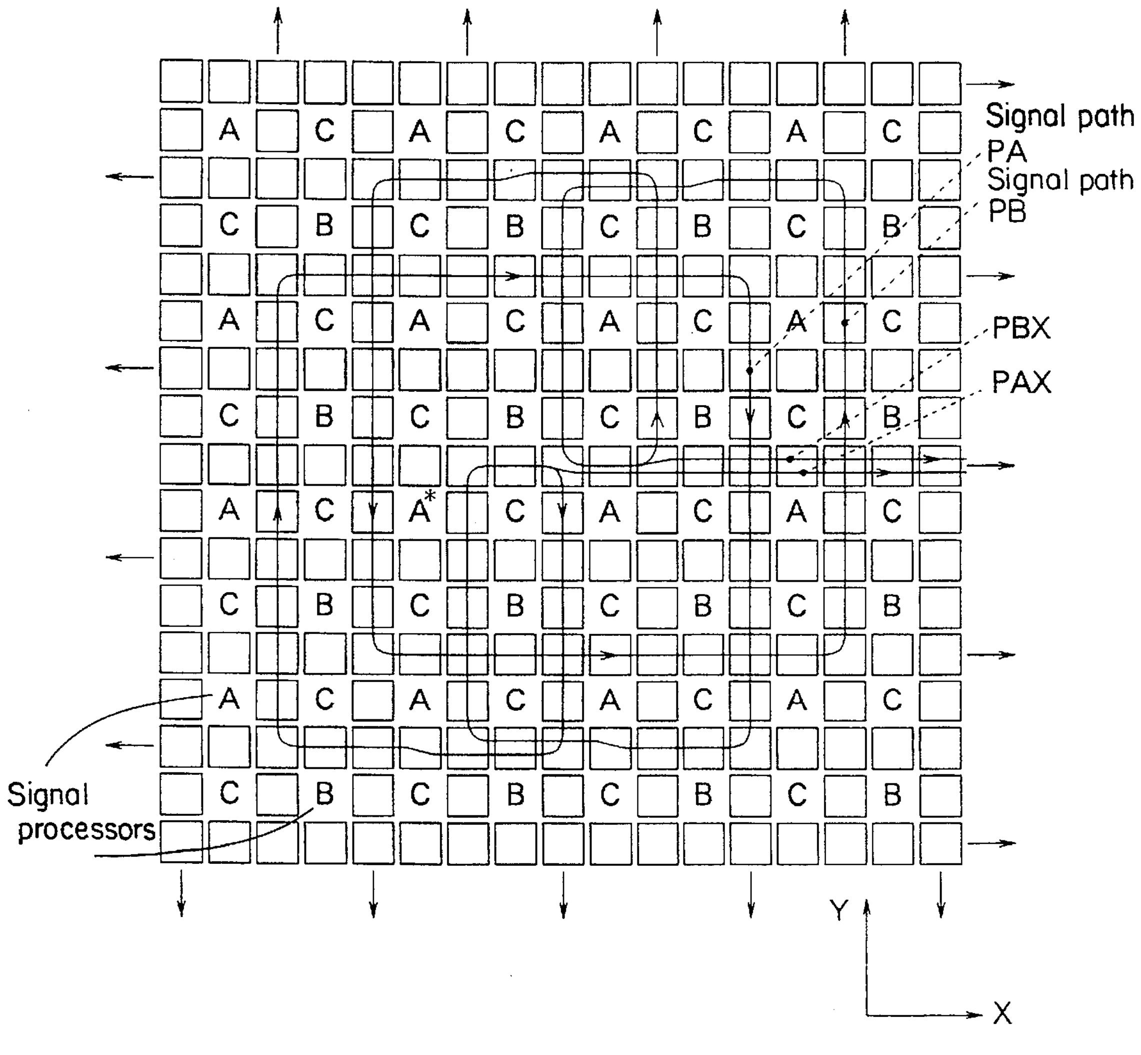
FIG. 3 is an illustration showing a construction of a device in which signal processors A and B operate in parallel and perform pipelining processings on a two-dimensional shift register mesh which constitutes the present invention.

FIG. 3 is an illustration showing a construction of a device in which the foregoing example is embodied on a two-dimensional shift register mesh (a net of plural shift registers arranged in meshes) and in which all signal processors indicated by A and B operate in parallel manner and perform pipelining processing on the mesh, respectively.

In FIG. 3, A and B are constructed such that analog inputs thereto are separately introduced directly from the outside through an optical input provided therein, respectively.

Also, there is adopted, in this example shown, a construction called SIMD (Single Instruction Multiple Data Stream) in which a digital input signal is supplied to all the signal processors through a common digital signal line (not shown) to them.

Before discussion of this device, the operation of the shift register array arranged in meshes will be described briefly with reference to FIG. 3.

As is seen from FIG. 3, the shift register mesh in this example has two groups of shift registers, each group consisting of plural shift registers arranged along straight lines, and one shift register group is disposed in orthogonal relation to the other shift register group, and the shift registers in orthogonal relation are shared at their intersections.

Each shift register placed along a straight line is shifted in the direction shown by an arrow at the marginal space of FIG. 3.

All shift registers belonging to the same group perform shift operations thereof concurrently except when they perform their input/output operations from/to the outside thereof.

Assuming a shift operation of the shift register group in the direction in parallel to the X axis is represented by "0" and a shift operation of the shift register group in the direction in parallel to Y axis is represented by "1", respectively, the shift operations of the shift register array can be expressed by a series of numerals of "0" and "1".

It is important that since a signal or signals in analog memory of each shift register cannot be erased or interfered with one another by its shift operation except data erased at the marginal portion of the mesh by shift operation of data, data held in each analog memory before its shift operation certainly exist somewhere in the shift register after its shift operation, too.

Now, looking at an analog memory of a shift register positioned at right side of a signal processor denoted by A*, a moving path of a signal held in this memory before its shift operation is as shown by PA in case a sequence of shift operations of fifty five (55) times is performed according to the following equation (2).

(10011111 10000001 11111111 10000000 00011111 11111000 00011111) (2)

As is apparent from FIG. 3, the path PA is a closed curve from its starting point back to its starting point, and passes by twenty-four (24) signal processors including the signal processor A* at its starting point.

Therefore, if a construction is taken in which respective outputs from these twenty four signal processors are added to PA, the same sum of product operation as in FIG. 1 can be performed.

Owing to periodicity of the structure of the mesh, analog memories at right sides of all other signal processors denoted by A also have quite similar signal moving paths to PA formed concurrently.

Also, owing to symmetry of the mesh, analog memories at right sides of all signal processors denoted by B have signal moving paths PB formed which are symmmetrical in shape to PA, and each PB can receive output signals from the twenty-four signal processors as in PA.

In other words, independent signal transfer paths as many as the number of all signal processors denoted by A and B shown in FIG. 3 are virtually implemented on the mesh, and thus an independent sum of product operation can be performed along respective signal transfer paths and further the results of respective sums of product operation come back to the centers of respective receiving fields.

Figure 4:
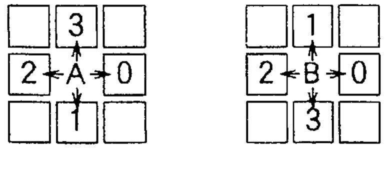
FIG. 4 is an illustration showing codes for output directions of the signal processors A and B which constitutes the present invention.

If one signal processor is viewed, the signal processor repeats an operation the required number of times, in which an output data thereof is added to any one of analog memory means of shift registers around the signal processor every two shift operations from the starting time of the signal processing, and assuming that codes for representing the directions in which the respective signal processors A and B output data are defined as shown in FIG. 4, respectively, a control for the output directions as shown in table 1 can be applied in order to perform parallel sums of product operation as intended on the paths of PA and PB.

TABLE 1

SELECTION OF OUTPUT DIRECTIONS D OF ARITHMETIC OPERATION MEANS CORRESPONDING TO A SEQUENCE OF SHIFTS Si

| | | | | | | | |
|---|---|---|---|---|---|---|---|
| Si | 10011111 | 10000001 | 11111111 | 10000000 | 00011111 | 11111000 | 00011111 |
| D | -------- | –1–1–1–0 | –2–0–2–0 | –3–3–3–3 | –3–2–0–2 | –0–2–1–1 | –1–0–2–0 |

In this example, output signals are returned back to their starting points, and so if they are returned back on the respective shift registers from which they are outputted without effecting any conversion on them or after conversion such as sigmoid transform is effected on the results of them by the signal processors A and B and shift sequences of the same kind are repetitively performed, then a hierarchical neural network, for example, or the like can be constructed. Alternatively, if the results of the output signals are transferred to optical output means denoted by C, output patterns can be transmitted directly to the outside with geometrical relative relationships of input patterns remained as they were.

In addition, if the following equation (3) is performed imediately after an end of the shift sequence, all the output data can be sequentially output to the outside from the left marginal end of the array of FIG. 3 along the paths PAX and PBX, respectively, likewise a CCD image sensor.

(10000000 00000000 . . . ) (3)

Further, there are various kinds of path designs of PA in addition to the above-mentioned path design, and independent transfer paths each passing by signal processors of, for example, sixty (60) can be implementd by a shift sequnce of 136 times shown in the following equation (4).

(10011111 10000001 11111111 10000000 00011111 11111111 10000000 00000001 11111111 11111111 10000000 00000000 00011111 11111111 11111000 00000001 11111111) (4)

That is to say, the hardware shown in FIG. 3 makes it possible to arbitrarily select a reference range of data (receiving field) only by a change of usage or operational manner, and so there is an significant advantage that flexibility is increased.

As is apparent from the foregoing description, acording to the present invention, a number of analog type pipelining processors which operate in a parallel manner can be virtually constructed on an analog type shift register array composed of a plurality of analog memories (registers) connected in cascade manner such as a CCD or the like, and it is possible to construct a processor which is suitable for processing at a high speed input signals having a high possibility of being applied in parallel.

Also, a range for access to data can be adjusted at will by selection of a shift sequence for a shift register array, and so a flexible and pliable utilization thereof can be effected depending upon various uses.

The present invention can be applied to fields of picture processings, neural networks, vision chips, spatial filters or the like.

I claim:

1. A systolic array processor comprising:

a plurality of signal processors each of which receives one analog signal and one digital signal, performs signal processing on the analog signal and the digital signal and outputs a result of the signal processing as an analog output signal;

a shift register mesh, including at least two groups of shift registers, a first group of shift registers being arranged orthogonally to a second group of shift registers, each of the first group and second group of shift registers including plural analog shift registers arranged linearly, each analog shift register having a plurality of analog memories, each of which has an analog signal stored therein, said shift register mesh adding the analog signal stored in each of the plurality of analog memories and an analog signal output from at least one specified signal processor among said plurality of signal processors and storing a result of each add operation in each of the plurality of analog memories, and sequentially shifting the added analog signal stored in each of the plurality of analog memories;

wherein the plurality of analog memories of each said analog shift register make up a charge transfer device; and a timing controller for controlling the signal processing of said plurality of signal processors, the adding, and the shifting to control a shifting direction of said at least two groups of shift registers.

2. The systolic array processor of claim 1 wherein one input signal to each of said plurality of signal processors is supplied from a transducer positioned near each signal processor.

3. The systolic array processor of claim 1 wherein one input signal to each of said plurality of signal processors is supplied from a digital signal source.

4. The systolic array processor of claim 1, further including optical output means for optically transmitting the analog signal stored in each analog shift register of said shift register mesh.

5. The systolic array processing of claim 1, wherein the charge transfer device is a charge coupled device (CCD).

6. The systolic array processing of claim 2, wherein the transducer is a phototransistor.

7. The systolic array processor of claim 4, wherein said optical output means is a light emitting diode.

8. A systolic array processor comprising:

a plurality of signal processors each of which receives one analog charge signal and one digital signal, performs signal processing on the analog charge signal and the digital signal, and outputs a result of the signal processing as an analog charge output signal;

an analog shift register, having a plurality of analog memories, each of which has an analog signal stored therein, said analog shift register, adding the analog signal stored in each analog memory and an analog charge output signal from at least one specified signal processor among said plurality of signal processors and storing a result of each add operation in each of the plurality of analog memories, and sequentially shifting the added analog signal stored in each of the plurality of analog memories;

wherein the plurality of analog memories of said analog shift register make up a charge transfer device; and a timing controller for controlling the signal processing of said plurality of signal processors, the add operations, and the shifting to control a shifting direction of said analog shift register.

9. A systolic array processor comprising:

a plurality of signal processors each of which receives one analog charge signal and one digital signal, performs signal processing on the analog charge signal and the digital signal, and outputs a result of the signal processing as an analog charge output signal;

a shift register array, including a plurality of analog shift registers, one of the plurality of analog shift registers being arranged in linear relation to another of the plurality of analog shift registers, each analog shift register having a plurality of analog memories each of which has an analog signal stored therein, said shift register array adding the analog signal stored in each of the plurality of analog memories and an analog charge output signal from at least one specified signal processor among said plurality of signal processors, storing a result of each add operation in each of the plurality of analog memories, and sequentially shifting the added analog signal stored in each of the plurality of analog memories, wherein the plurality of analog memories of each of said analog shift registers make up a charge transfer device; and a timing controller for controlling the signal processing of said plurality of signal processors, the add operations, and the shifting to control a shifting direction of said shift register array.

10. The systolic array processor of claim 8 or claim 9, wherein one input signal to each of said plurality of signal processors is supplied from a transducer positioned near each signal processor.

11. The systolic array processor of claim 8 or claim 9, wherein one input signal to each of said plurality of signal processors is supplied from a digital signal source.

12. The systolic array processor of claim 8, further including optical output means for optically transmitting the analog signal stored in said shift register array.

13. The systolic array processor of claim 9, further including optical output means for optically transmitting the analog signal stored in each analog shift register of said shift register array.

14. The systolic array processor according to claim 8 or claim 9, wherein said charge transfer device is a charge coupled device (CCD).

15. The systolic array processor according to claim 10 wherein said transducer is a phototransistor.

16. The systolic array processor according to claim 12 or claim 13, wherein said optical output means is a light emitting diode.

* * * * *